US011436108B1

(12) United States Patent
Jourdain et al.

(10) Patent No.: US 11,436,108 B1
(45) Date of Patent: Sep. 6, 2022

(54) FILE SYSTEM AGNOSTIC CONTENT RETRIEVAL FROM BACKUPS USING DISK EXTENTS

(71) Applicant: EMC IP Holding Company LLC, Hopkinton, MA (US)

(72) Inventors: Gerald M. Jourdain, Hudson, NE (US); Abinas Tewari, Charlotte, NC (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/443,084

(22) Filed: Jul. 20, 2021

(51) Int. Cl.
*G06F 12/00* (2006.01)
*G06F 11/14* (2006.01)
*G06F 3/06* (2006.01)

(52) U.S. Cl.
CPC .......... *G06F 11/1469* (2013.01); *G06F 3/067* (2013.01); *G06F 3/0619* (2013.01); *G06F 3/0644* (2013.01); *G06F 11/1435* (2013.01); *G06F 11/1451* (2013.01); *G06F 11/1464* (2013.01)

(58) Field of Classification Search
CPC .. G06F 11/1469; G06F 3/0619; G06F 3/0644; G06F 3/067; G06F 11/1435; G06F 11/1451; G06F 11/1464
See application file for complete search history.

(56) References Cited

U.S. PATENT DOCUMENTS

| | | | |
|---|---|---|---|
| 7,549,037 B1 * | 6/2009 | Kale | G06F 11/1466 711/219 |
| 9,928,210 B1 * | 3/2018 | Zhang | G06F 16/1724 |
| 11,321,281 B2 * | 5/2022 | Kumarasamy | G06F 16/252 |
| 2020/0272352 A1 * | 8/2020 | Zhang | G06F 3/0608 |
| 2021/0240573 A1 * | 8/2021 | Upadhyay | G06F 11/1451 |
| 2021/0311839 A1 * | 10/2021 | Kumarasamy | G06F 16/275 |

* cited by examiner

*Primary Examiner* — John A Lane
(74) *Attorney, Agent, or Firm* — Workman Nydegger

(57) ABSTRACT

Techniques for generating an enhanced backup catalog that preserves file extents for a file that is being backed up are disclosed. A file is identified. A directory structure is consulted to identify a mapping of extents that exist for the file. A backup process is triggered to backup the file. A backup catalog, which is generated as a part of the backup process, is modified to include a list of the extents for the file. This modified backlog catalog is referred to as an enhanced backup catalog. The enhanced backup catalog is then stored in remote backup storage.

20 Claims, 10 Drawing Sheets

FILE SYSTEM AGNOSTIC CONTENT RETRIEVAL FROM BACKUPS USING DISK EXTENTS

FIELD OF THE INVENTION

Embodiments of the present invention generally relate to improved file backup techniques. More particularly, at least some embodiments of the invention relate to systems, hardware, software, computer-readable media, and methods for generating an enhanced backup catalog that preserves file extents for a file that is backed up during a backup process.

BACKGROUND

A "disk backup" is a data storage and recovery method by which data from one device is copied and stored at a remote location. Backing up data is performed to protect against various disasters, data loss events, and to provide business continuity. Backups are used to recover data in the event of a data loss. Backups are also used to recover prior versions of a file.

Generally, a data backup process involves selecting data, copying that data, and then storing the copied data to a remote storage device. Current data protection offerings take regular backups of assets (e.g., servers, clients, NAS shares, databases, VMs, etc.). There is usually a day 0 backup where all asset content is backed up and subsequent, incremental backups where just the changes (i.e. deltas) are captured. These backups can later be used to restore an asset to a previous point in time.

As opposed to restoring an entire asset, customers have asked backup vendors to provide the capability to restore individual files within the asset, which process is generally known as "File Level Retrieval." These retrievals are performed by mounting the backup and using the operating system to access the files.

Generally, the term "mounting" refers to a process where a file system or operating system performs operations to make available certain files, folders, and/or directories on a device. This mounting process can include accessing the files, reading them, and then processing the file system structure and related metadata. More specifically, mounting a backup involves several steps, including: (1) establishing a network connection to the backup on the remote storage, (2) reading backup header information to determine the backup type, (3) reading in a master boot record, (4) reading a partition table, and (5) for each partition, determining the file system attributes (e.g., call the file system initialization, load the file system configuration and directory structure, and assign the file system to a virtual mount point). Mounting a drive, or rather a backup, can consume a significant amount of time and processor usage. Additionally, the number of file systems that can be simultaneously mounted is limited as well as existing mount points and memory requirements for each loaded file system. Once a file system is mounted, the retrieval process also needs to understand the file system and backup format embedded in the backup. Since backup formats are not all the same, the operating system and its supporting file systems are relied upon to access the file content. What is needed, therefore, is an improved technique for accessing backup data with improved access speeds and other improved operations.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION

Figure 1:
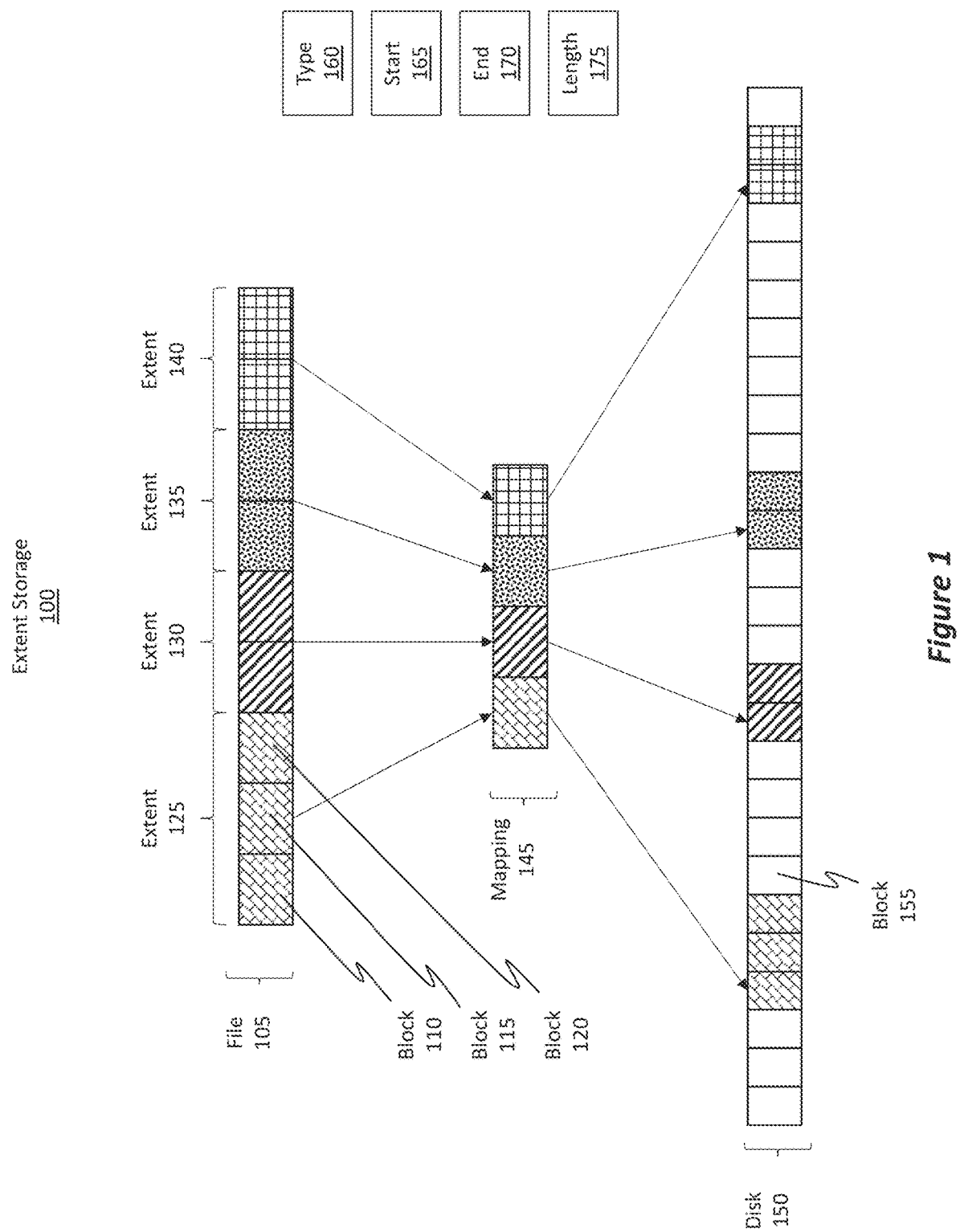
FIG. 1 illustrates various aspects of extents and how those extents are stored in storage.

Embodiments disclosed herein relate to systems, devices, and methods for generating and using an enhanced backup catalog, which is designed to preserve file extents for a file that is backed up during a backup process.

In some embodiments, a file, which is selected to be backed up, is identified. The embodiments then consult a directory structure to identify a mapping of extents that currently exist for the file. The extents are distributed across different portions of storage of a computer system that is storing the file. Furthermore, each one of the extents includes one or more blocks of data for the file. The embodiments also trigger a backup process for the computer system. Here, chunks of data stored by the computer system are selected for back up to remote backup storage, and the chunks of data are selected in a manner such that, for at least one of the extents, blocks forming that extent are included in different chunks thereby resulting in those blocks being dispersed during the backup process. The embodiments modify the mapping of extents to include updated information reflecting current locations for blocks that form the file. As a consequence, updated extents are generated and included in the mapping. The embodiments additionally modify a backup catalog that is generated as a part of the backup process. The backup catalog is modified to include the modified mapping of extents for the file. As a result, the modified mapping of extents for the file is preserved in the backup catalog. The process of including the modified mapping of extents for the file in the backup catalog results in generation of an enhanced backup catalog. The enhanced backup catalog is then stored in the remote backup storage such that the modified mapping of extents for the file is preserved in the remote backup storage.

Some embodiments use an enhanced backup catalog, which preserves file extents for a file that is backed up and which is included in a backup in a remote backup storage, to extract the file directly from the remote backup storage without mounting the backup. For example, some embodiments receive a request to access a backup of a file that is backed up to a remote backup storage. The embodiments refrain from mounting the backup of the file. The embodiments access an enhanced backup catalog at the remote backup storage. The enhanced backup catalog includes a mapping of extents for the file, and the mapping of extents identifies locations where blocks of data forming the file are stored in the remote backup storage. The embodiments consult the enhanced backup catalog to identify the mapping of extents. The mapping of extents is then used to identify the blocks of data forming the file. The embodiments can then retrieve the file based on the identified blocks of data.

Some embodiments are configured to generate an enhanced backup catalog that preserves file extents for a file that is backed up during a backup process. For example, some embodiments trigger a backup process for a file stored on a computer system, where a backup of the file is to be stored on a remote backup storage. The embodiments identify blocks of data forming the file on the computer system and also modify a backup catalog that is generated as a part of the backup process. The backup catalog is modified to include location information detailing where the blocks of data forming the file are to be stored in the remote backup storage. The process of modifying the backup catalog results in generation of an enhanced backup catalog. The embodiments then cause the enhanced backup catalog to be stored in the remote backup storage.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous benefits, improvements, and practical applications to the technical field of backup techniques. Specifically, the embodiments beneficially enable devices to directly access backup data without having to mount a backup. In doing so, the embodiments significantly speed up the access speeds and also improve the computer's efficiency (e.g., by avoiding having to spend compute time in performing the mount).

The disclosed principles are also file system agnostic and even backup format agnostic. As such, any type of file system and backup format can be used by the disclosed embodiments, thereby leading to widescale usage and practicality. Furthermore, as backups become increasingly large, there may be millions of files that need to be mounted if traditional approaches were followed. By avoiding the mounting process and instead allowing devices to directly access the backup, the level of overhead (e.g., searching for a file's blocks in a mounted system) is significantly reduced. The embodiments provide for improved access speeds, reduced network congestion, and improved processor usage.

Furthermore, it should be noted that relying on an operating system or backup application software to decode a backup is problematic and single instanced. The time necessary to prepare the backup for extraction is expensive and retrieval is targeted at a single backup copy, thus requiring the user to know which backup to retrieve from.

Some techniques are currently available to perform File Level Retrieval (FLR). For instance, one technique involves using a dedicated server running an operating system that contains support for all the different file systems residing in backups. Another technique involves mounting the backup directly to a destination asset. Yet another technique involves combining the use of a retrieval server to perform orchestration and an embedded FLR agent to provide the directory browsing and ease of file restoration.

All the above solutions, however, have a file selection problem. That is, since assets have potentially millions of files, traversing a file system through a GUI in order to select a file to restore is tedious or impractical. The user may not even be able to find or identify the desired file. This issue is compounded when the user does not know in which backup the desired file content resides.

In order to address the clunky file selection process described above, a backup vendor may introduce the ability to catalog backups. This process stores metadata about each file and directory in a searchable index. This index can then be used to perform queries where the results can be used as input to the file retrieval process.

Searching a catalog helps, but if these query results are targeted at a single backup, then the user still needs to know which backup the file content is on. If the query spans multiple backups, then either the user is confined to selecting a single file instance for retrieval or if multiple files are selected across different backups then mount time for many backups is exacerbated. None of this leads to an optimal user experience or acceptable retrieval performance. The disclosed embodiments provide solutions to these pressure points. Accordingly, these and numerous other benefits will now be discussed in more detail throughout the remaining portions of this document.

Extent Storage

Attention will now be directed to FIG. 1, which illustrates how extents are stored, as shown by extent storage 100. Initially, it is noted how a file 105 is comprised of multiple blocks (e.g., block 110, 115, and 120) that are used to store data for the file 105. A block of data is a grouping or sequence of bytes with a maximum length. A block of data is the smallest unit of data that can be used at a given time by an application, such as perhaps a database. Stated differently, blocks are fixed in size, where that size is designed to enable the data in that block to be read or written in a single computing operation.

An extent (e.g., extent 125, 130, 135, and 140) is a contiguous area of storage that includes multiple blocks in a file system. For instance, the extent 125 is shown as including blocks 110, 115, and 120. The extents 130, 135, and 140 are shown as including different blocks, as represented by the different shading patterns for the blocks in the file 105. As an example, it may be the case that extent 125 includes block 10,014, block 10,015, and block 10,016 on a storage device. Those three blocks can make up a single extent. As shown, a single file can be made up of multiple different extents.

A mapping 145 can be used to identify where the blocks and extents exist in a file system. For instance, FIG. 1 shows a disk 150, which is used to store data. Although this example is focused on the use of a "disk" as a storage medium, one will appreciate how any type of persistent storage medium can be used. Indeed, any type of disk, tape, solid state drive, and so on can be backed up. Accordingly, examples that reference a "disk" are for example purposes only and should not be limiting.

Notice, the blocks 110, 115, and 120 are included in the disk 150, as represented by the common shading pattern. Similarly, the other blocks are also included in the disk 150. The blocks of a particular extent are contiguous with one another, but it might be the case that different extents are not contiguous with one another, as shown by block 155 separating extent 125 from extent 130 (in addition to a few other blocks). If the extents are not contiguous with one another, then the disk 150 (or rather the file 105) is said to be fragmented. The mapping 145 is provided to identify where in the disk 150 the extents are located.

Ideally, disks would be de-fragmented, meaning all files are comprised of only a single extent. In reality, however, that is not the case. When allocating space for a file, it is typically the case that the next available block is not contiguous to blocks already assigned to the file, thereby resulting in a fragmented storage drive. The number of blocks included in a particular extent is determined by the file system of the computer and potentially on the number of partitions available on the storage.

Different file types can have different extent types (e.g., as shown by type 160). For instance, one type 160 can be a uniform extent type (e.g., a single object owns all of the uniform extents). Another type 160 can be a mixed extent type (e.g., different objects can own the different mixed extents). In some cases, the mapping 145 includes a start 165 position of a first block in the extent in the disk 150. The mapping 145 can also include an end 170 position of a last block in the extent in the disk 150. In some cases, the mapping 145 includes the start 165 position and a length 175 of the extent. Accordingly, different techniques can be used to identify extent locations (and hence block locations) within the disk 150.

Disk Backup

Figure 2:
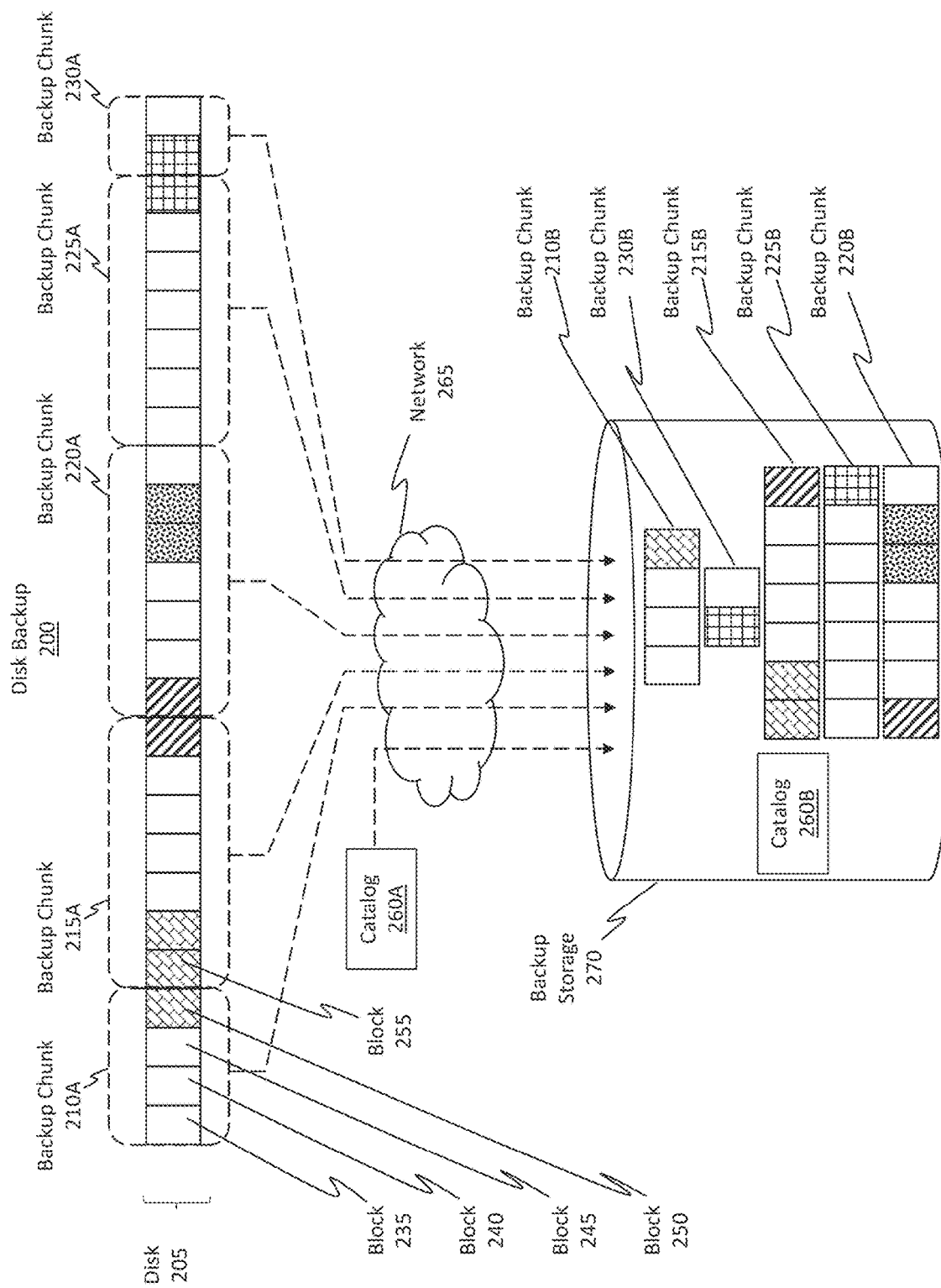
FIG. 2 illustrates a disk backup process and how traditional backup processes destroyed extents.

FIG. 2 shows an example of a disk backup 200 process in which the disk 205, which is representative of the disk 150 from FIG. 1, is backed up to a remote backup storage. Traditionally, when the disk 205 was backed up, the extents for a file were lost.

That is, traditional backup technologies relied on backing up chunks of data, where dividing the disk 205 into chunks resulted in the loss of file extents. FIG. 2 is illustrative.

FIG. 2 shows a backup chunk 210A, backup chunk 215A, backup chunk 220A, backup chunk 225A, and backup chunk 230A. FIG. 2 also shows a block 235, block 240, block 245, block 250, and block 255. Blocks 250 and 255 belonged to the extent 125 from FIG. 1. The backup chunk 210A includes blocks 235-250. From FIG. 2, one can observe how the file extent 125 from FIG. 1 is broken apart in that some of the blocks forming the file extent 125 are included in different backup chunks (e.g., backup chunk 210A and 215A). As a consequence, the notion of extents is typically lost during traditional backup processes.

Stated differently, the backup process generally involves copying chunks of data, which might result in extents being broken apart, and storing those chunks in remote storage. As a result of this chunk-based backup process, the categorization or formatting provided by extents is lost. Additionally, the whole notion of a file can also be lost. That is, when a backup is performed, most backups involve backing up only a delta or change from what was previously backed up. Only the very first backup includes the entirety of the file system; subsequent backups typically involve identifying what has changed and then storing those changes. Therefore, when chunks of blocks are backed up, those blocks do not necessarily have a one-to-one association with specific files. Accordingly, as a result of the backup process, the formatting of extents has traditionally been lost.

The backup process also includes the generation of a catalog 260A. Generally, the catalog 260A indicates where the individual blocks of a file are located, such as where on the backup the file's blocks start and how long they are. Traditionally, however, the catalog did not include any indication of file extents.

The backup process includes transmitting copies of the backup chunks over a network 265 to backup storage 270 along with the catalog (e.g., catalog 260B). For instance, the backup storage 270 is shown as including the copies of the disk 205, as shown by backup chunk 210B, 230B, 215B, 225B, and 220B. In some cases, the ordering of the chunks is not preserved, as shown in FIG. 2. Accordingly, traditional techniques for backing up disk storage failed to include or preserve the notion of file extents.

Techniques for Preserving File Extents During Backup Processes

FIGS. 3 through 6 illustrate various architectures and supporting illustrations describing embodiments that are configured to generate an enhanced catalog designed to preserve a file's extents, even during a backup process. Generally, the embodiments are able to extract file content directly from the backup on storage without needing an operating system or loaded file system. The embodiments normalize the access to backup formats and store that normalization, thereby making it available to the retrieval process. When it comes time to perform a file level retrieval, this normalized data can be used to seek and read file content directly from the backup.

Normalization removes the need for mounting a backup into an operating system. Normalization also removes the need to use either the file system or a backup application to read the mounted content. Thus, normalization allows direct access to content in a backup simply by opening, seeking, and reading. The implementation beneficially enables the normalization to contain pertinent file location information which allows data access as well as access to alternate stream data, like access control lists (ACLs) and metadata.

In the simplest case, the backup itself is a copy of a hard disk, block for block. In this case, the hard disk contains a partition table where each partition contains a separate file system. At a high level, during the cataloging process, the location of each file will be collected. In many cases, the file system stores its file data in a collection of disk extents.

A disk extent, as described previously, is a contiguous region on a disk with a starting and ending block number. A file's content, on most file systems, is contained in one or more ordered disk extents. For example, a file may have 100 blocks of content in two disk extents where disk extent one starts at block number 123,456 and ends at block 123,505 and disk extent two starts at block 80,000 and ends at 80,049. Each of these extents are 50 blocks in this example. Notice that the second extent is comprised of lower block numbers than the first. As a file grows, additional disk extents can be added. Using disk extents allows for modifying files without requiring that the entire file be contiguous.

The more disk extents contained in a file system, the more fragmented a file system has become. Disk maintenance can require de-fragmentation, which is the process of combining disk extents. A completely de-fragmented disk would have one disk extent for every file.

The disclosed embodiments effectively build a disk extent list for all the files during the data protection process and use that list to later enable recovery of individual files and their content from the backup without requiring the backup to be restored or mounted by an OS file system. There are many different extent-based file systems and even non-extent-based file systems. The building of the disk extent list involves normalizing the disk extent across all the disparate file systems, thereby making the file level restore independent of the actual file system that wrote the asset.

In the case of non-extent-based file systems or files that are stored without using extents, an application level "extent" (or "virtual" extent) will be defined to be able to retrieve those files. For example, small file content can be stored in the actual directory inode itself. In this case an application defined "embedded disk extent" will be created and used to represent this file's content. The embedded disk extent includes a starting offset and a length rather than starting and ending blocks used in a normal disk extents.

The catalog building process involves enumerating the file system and creating a separate record for each file and directory. During this process, the disk extents will be gathered, aggregated, compressed, and stored in each record. During the extent extraction, all the different types of extents can be encoded for things like embedded content, alternate data streams, access control lists (ACLs), metadata tags, and so on.

For example, if the destination backup itself is a database, then the extent can be comprised of table and record information or offset and size information. In this regard, the embodiments beneficially have the extent define the content extraction process.

The catalogs for all the backups are indexed into a central database or full text index. This centralized index can then be queried for file content and the results can contain these extents. From the query results, items can be selected either by a user through a GUI or programmatically by an application. The selected items now contain the extents for each item, and the retrieval server can now be passed these extents. These extents are used to directly pull content from the backup without the need of a mount, operating system, or file system. The extraction process has been normalized across all the disparate backup layouts.

Figure 3:
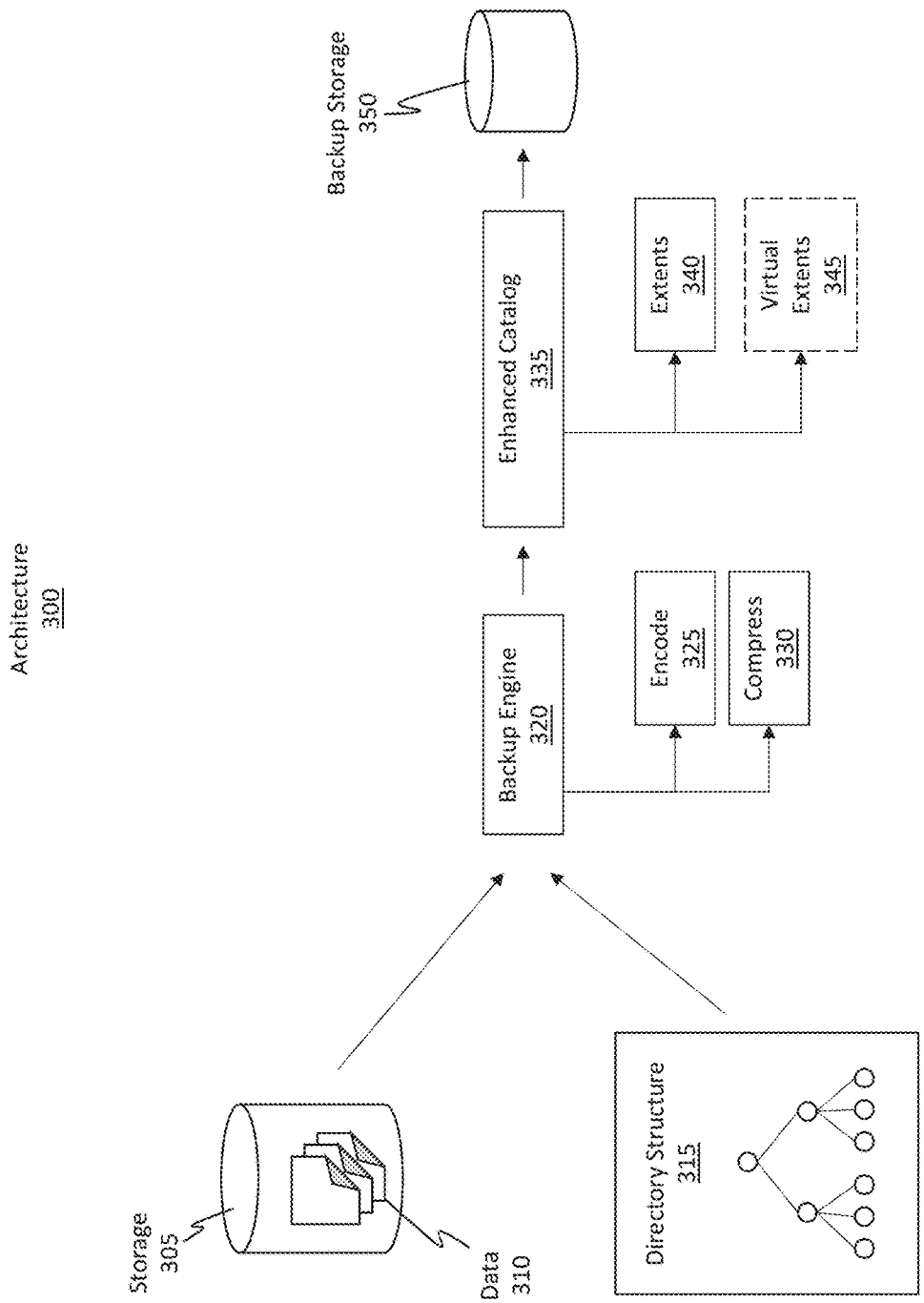
FIG. 3 illustrates an improved architecture designed to preserve extents during disk backups.

With that introduction, attention will now be directed to FIG. 3, which shows an example architecture 300. Architecture 300 includes storage 305, which is storing data 310. Storage 305 is representative of the disk 205 from FIG. 2 and disk 150 from FIG. 1, and the data 310 is representative of the file 105. Architecture 300 also shows a directory structure 315. The directory structure 315 refers to how the files stored on a disk are organized into a hierarchy of folders. That is, the directory structure 315 refers to the manner by which a file system arranges its files. Such arrangement is typically performed using a tree structure. The mapping 145 from FIG. 1 is typically included in the directory structure 315.

Notably, the operating system does not necessarily have to be running in order to generate the catalog included as a part of the directory structure 315. For example, consider a virtual machine (VM) running on a server. It might be the case that the VM is not running but rather is idle. The embodiments can still back up the VM and can still generate the catalog despite the fact the VM is not running. In this sense, it is not necessary to utilize the OS when constructing a catalog.

In accordance with the disclosed principles, the embodiments utilize a backup engine 320 to facilitate, supplement, or augment the backup process. The backup engine 320 can be a software routine or it can even be a machine learning algorithm.

As used herein, reference to "machine learning" or to a ML model or to a "neural network" may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), Markov transition state or Markov chain, or any other type of intelligent computing system. Any amount of training data may be used (and perhaps later refined) to train the machine learning algorithm to dynamically perform the disclosed operations.

The backup engine 320 is able to communicate with the directory structure 315 to identify the file's extents. The backup engine 320 can then optionally encode 325 the listing of extents (aka mapping of extents). To be clear, as used herein, the phrases "mapping of extents" and "listing of extents" are interchangeable with one another. Any type of encoding can be used. For example, a base 64 encoding scheme can be performed as well as binary, ASCII, Unicode, EBCDIC, full text, and so on. Indeed, any type of encoding scheme can be used. The encoded listing is then compressed (e.g., as shown by compress 330).

After the listing of extents is encoded and compressed, the listing is then stored as a new item in the catalog that is generated as a part of the backup process. In doing so, an enhanced catalog 335 is generated, where the enhanced catalog 335 now includes an indication of the extents 340 for the files that are being backed up and where the enhanced catalog 335 is self-describing (i.e. it describes the locations where file blocks are stored).

Some file systems might not use extents. For such systems, the embodiments can generate their own version of extents for a file, as shown by virtual extents 345. That is, in the case of non-extent-based file systems (or files that are stored without using extents), an application level or "virtual" extent can be defined for a particular file. For example, consider a small file. This small file can be stored in the actual directory inode itself. In this case, an application defined or virtual "embedded disk extent" will be created and used to represent the file's contents. The embedded disk extent (i.e. virtual extent) will be comprised of a starting location and a length. Accordingly, some embodiments emulate extents if they do not already exist such that the embodiments can build up extents.

Figure 4:
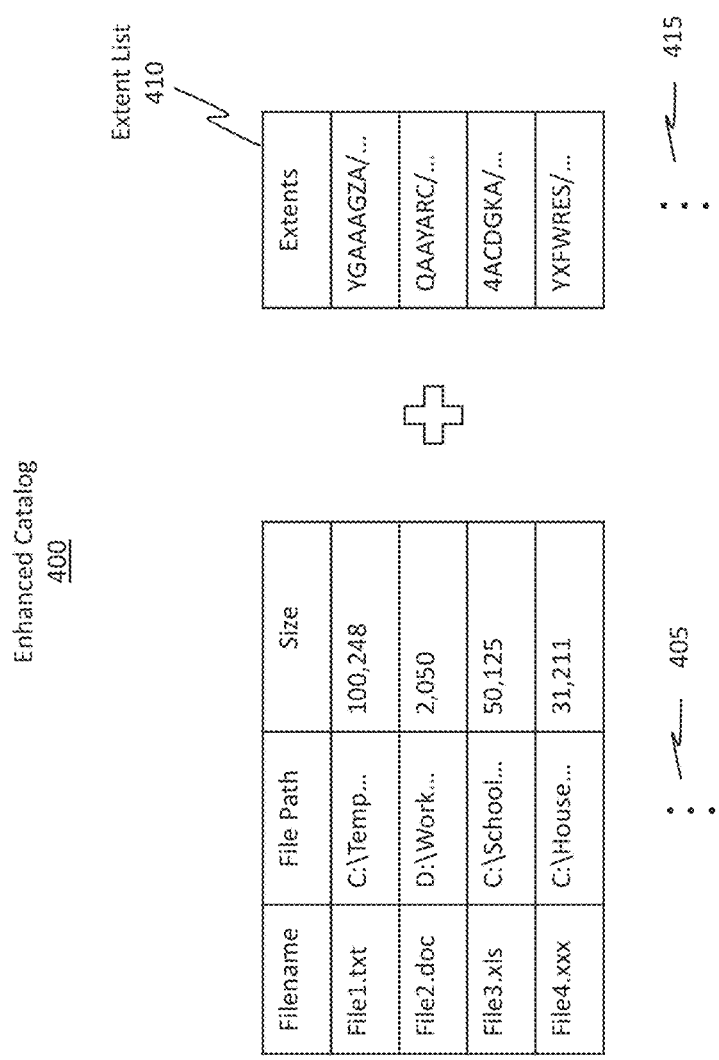
FIG. 4 illustrates an example of an enhanced backup catalog.

The enhanced catalog 335 is then stored in the backup storage 350 along with the chunks of disk that were backed up. FIG. 4 provides some additional information regarding the structure of the enhanced catalog 335.

Specifically, FIG. 4 shows an enhanced catalog 400, which is representative of the enhanced catalog 335 of FIG. 3. Traditionally, a backup catalog included information such as the filename, file path, and even size of a particular file. The catalog can include any number of line items for any number of files that were being backed up, as shown by the ellipsis 405.

In accordance with the disclosed principles, the embodiments are able to append or attach an extent list 410 for each respective file that is included in the catalog. For instance, for the file named "File1.txt" a listing of one or more extents is appended in the form of a new column to the catalog to thereby form the enhanced catalog 400. The ellipsis 415 shows how any number of extents for any number of files can be included in the enhanced catalog 400. Generally, the extent list 410 identifies the addresses of blocks forming the corresponding file.

Figure 5:
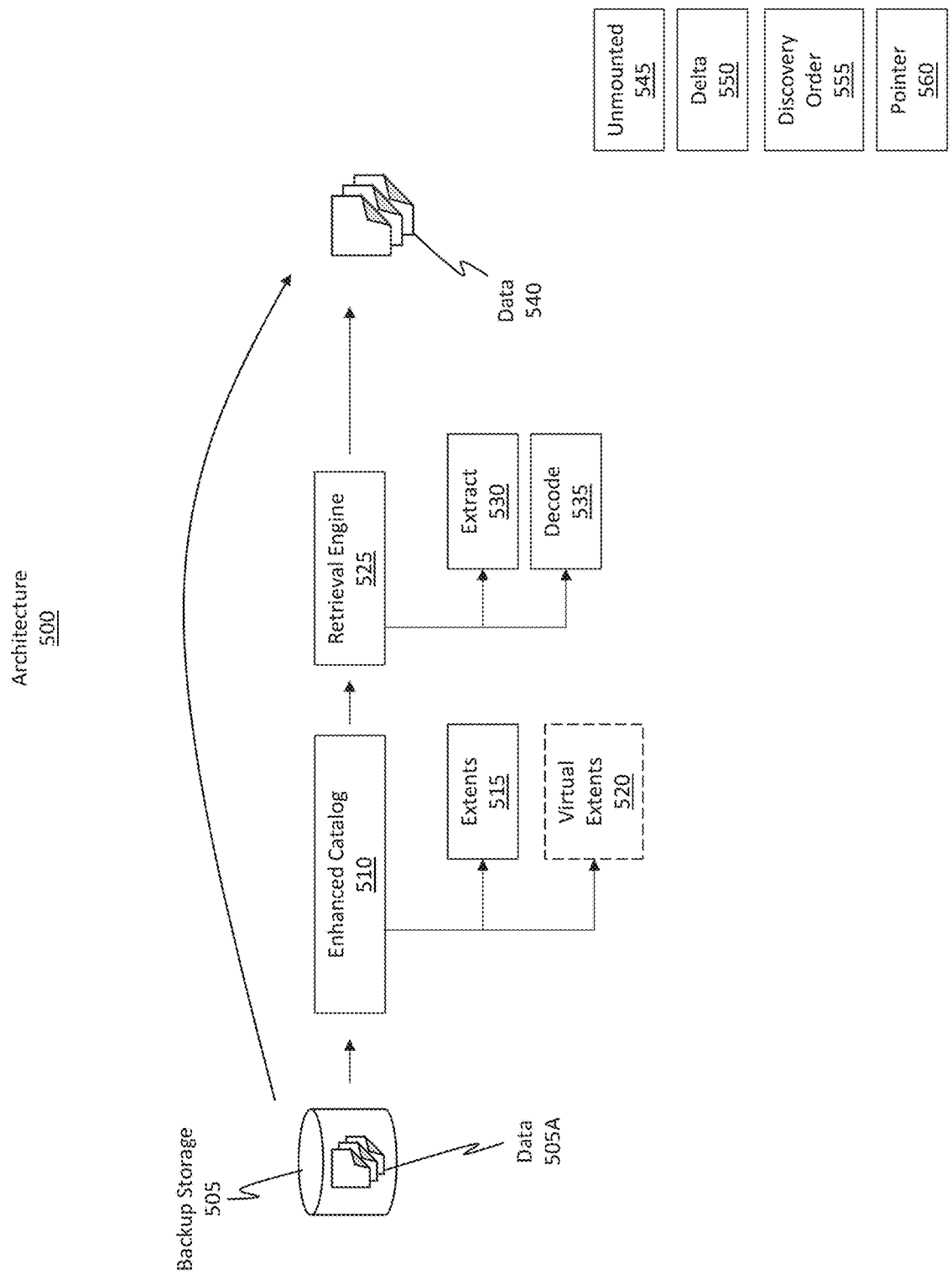
FIG. 5 illustrates an improved architecture that uses an enhanced backup catalog to directly retrieve content from a backup without having to mount the backup.
Figure 6:
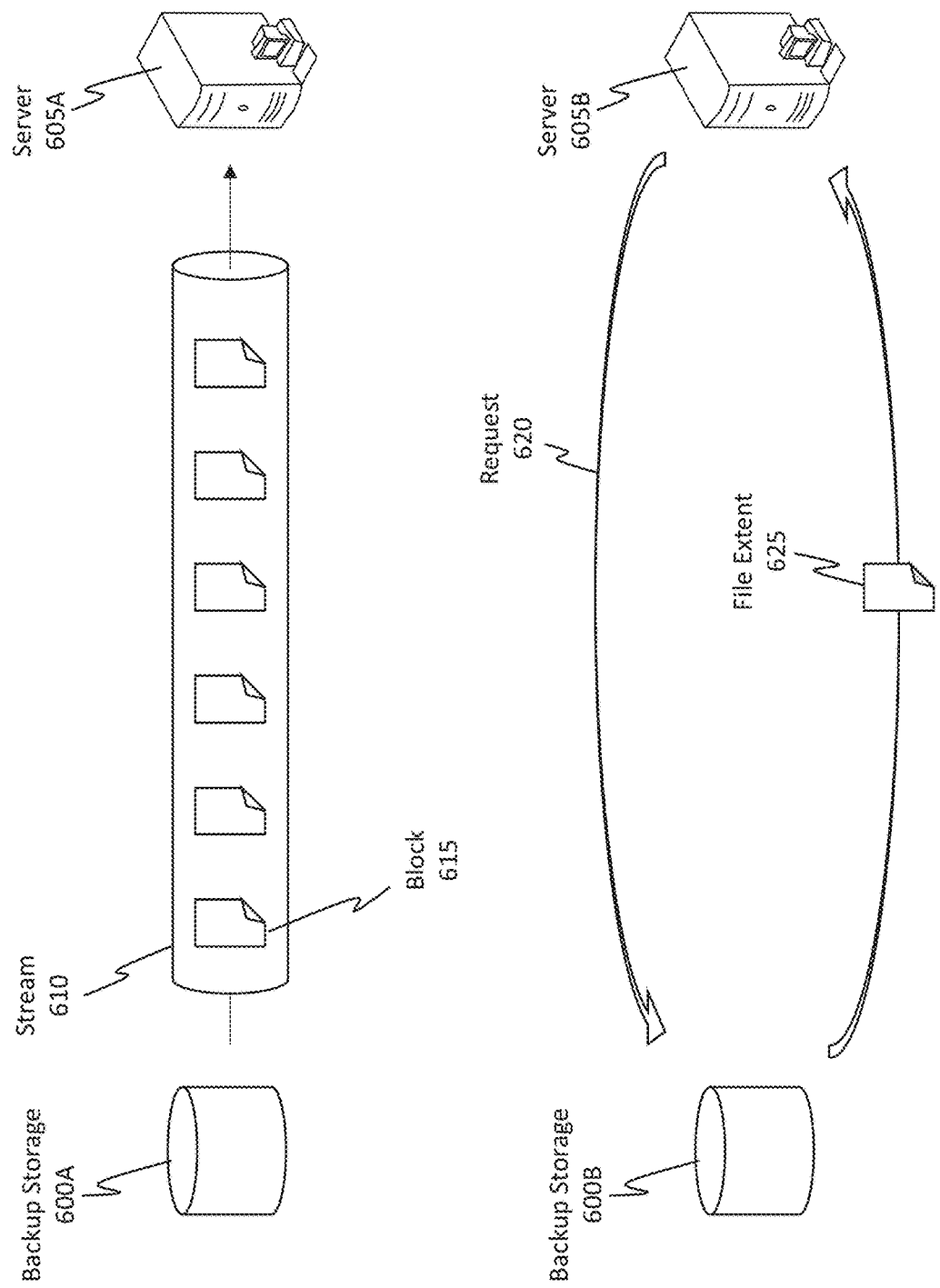
FIG. 6 illustrates different techniques for retrieving the file content from the backup.

As discussed previously, the enhanced list 410 is comprised of a listing of extents that has been encoded and compressed. Such operations are performed to ensure that a size of the enhanced catalog 400 does not exceed a threshold size for storage in the backup storage. Accordingly, FIGS. 3 and 4 generally discussed example techniques for generating an enhanced catalog that is designed to preserve file extents during a backup process. FIGS. 5 and 6, on the other hand, describe various techniques for using that enhanced catalog in order to retrieve files from storage.

FIG. 5 shows an example architecture 500 that includes backup storage 505, which is representative of the backup storage 350 from FIG. 3 and which includes data 505A. The architecture 500 can be combined with the architecture 300 of FIG. 3 or it can be an independent architecture. As discussed previously, the backup storage 505 includes an enhanced catalog 510, which is representative of the enhanced catalog 335. The enhanced catalog 510 includes extents 515 and/or virtual extents 520 for files that are backed up in the backup storage 505.

In accordance with the disclosed principles, the embodiments are able to use a retrieval engine 525 to access the enhanced catalog 510 in order to extract 530 or de-compress the listing of extents and then decode 535 the de-compressed or extracted listing. The retrieval engine 525 can also be a routine or machine learning engine.

With the listing of extents now available, the embodiments can use the listing of extents to access the backed up version of a file, as shown by data 540. Notably, and very beneficially, the embodiments can access the backed up version of the file without having to mount the backup to the accessing computer system (aka retrieval system), as shown by unmounted 545. That is, traditionally, in order to access backed up data, the backup would need to be mounted to the computer system that was attempting to access the back up. The mounting process generally involves a computer system finding a backup on the remote backup storage, opening the backup, reading the partition table to disk, caching the data, and then using the operating system to load the backup by opening a new drive. Such a process could be quite time consuming.

Because the file's extents are now preserved in the enhanced catalog, the disclosed embodiments can avoid or refrain from having to mount the backup to an accessing computer. Furthermore, individual files can now be obtained (i.e. FLR can be performed without having to mount the backup). Now, the accessing or retrieving computer can use the enhanced catalog to directly access the backed up data without having to mount it. That is, the embodiments are able to read the blocks of data (as organized or defined by the listing of extents) directly from the remote backup storage and then feed those blocks of data to whatever application is requesting the data without the need for mounting and crawling to the data.

Additionally, the process of retrieving the file can be performed agnostically relative to a file system type. That is, because the embodiments avoid having to mount the backup, the type of file system is now irrelevant to being able to access the backup contents. Relatedly, the process of retrieving the file can be performed agnostically relative to a backup format. Indeed, any format for a backup and any file system type can now be used.

When storage is first backed up, the backup process is quite lengthy because the entirety or at least a majority of the disk is subjected to the backup process. After that initial backup occurs, however, the backup process will typically backup only the deltas (e.g., delta 550) or differences that have occurred since the last backup. Despite this, a new catalog is generated for each backup, and the embodiments are able to augment that catalog to include the listing of extents. Therefore, even if a backup includes only delta information, the enhanced catalog will still be generated and will still enable an accessing computer to access the underlying files. The enhanced catalog will record the extents for a file, even if those extents are located in different backup versions. These extents are then used to determine the version of the file as it existed at the time of a particular backup. Accordingly, file blocks can be searched for even across different backup versions.

Different mediums can be used to backup data. For instance, tape can be used to backup data, a hard drive can be used, solid state drives can be used, and so on. Access speeds for some mediums are faster than other mediums. The disclosed embodiments can be agnostic with regard to the discovery order 555 of a file's blocks on the backup storage. For instance, the file's blocks can be initially accessed out of order. Those blocks can be cached and then a pointer 560 can be used to access the blocks in the correct order in order to reconstruct the underlying file.

As an example, suppose a tape medium is being used to backup data. It may be the case that a particular file's blocks are stored out of order on the tape. For instance, suppose the file is comprised of blocks A, B, and C, in that order. On the tape, however, the blocks may be arranged in the following order B, C, and A. During the seeking process on the tape, the B block is accessed first, then the C block, then the A block. There are benefits (e.g., reduced access time) to not requiring a file's blocks to be discovered in a specific order, such as by refraining from having to seek backwards or shuffle between access locations. Now, the blocks can be retrieved based on storage order and then cached. The pointer 560 can then be used to ensure the access order (e.g., by the retrieving system) is correct in order to reconstruct the file.

FIG. 6 shows two different techniques for accessing backed up content directly, without having to mount the backup. FIG. 6 shows backup storage 600A, which is representative of the backup storage mentioned thus far. Also shown is a server 605A or any other type of accessing computing device.

In one scenario, a stream 610 can be initialized between the backup storage 600A and the server 605A, where the stream 610 includes the blocks for the file, as shown by block 615. That is, the blocks for the file can be read into the stream 610 and transmitted to the server 605A. The stream 610 can also provide the ordering of the blocks to inform the server 605A how the server 605A is to access the streaming blocks.

With the stream implementation, the application requesting the backup data does not need to know that the embodiments are crawling the disk extents directly from the backup. As a consequence, the embodiments can also offer the stream to any third party application. The third party application can read the stream and then the stream can read the blocks directly from the backup storage. The backend of the stream is comprised of the list of disk extents. The accessing application can access the block data in a continuous manner while the stream obtains the different extents, thereby providing data to the application despite the fact that the file was stored in different chunks on the backup storage. Additionally, the stream can be configured to support both forward and backward movement in a character form without necessarily requiring an understanding of disk extents.

In an alternative scenario, the blocks of data can be requested and read block-by-block or file extent by file extent. FIG. 6 also shows this technique. Specifically, FIG. 6 shows the backup storage 600B and the server 605B. The server 605B is able to transmit a request 620 directly to the backup storage 600B using the enhanced catalog to obtain a particular file extent 625 or a group of extents or blocks. The backup storage 600B can then provide the requested file extent 625 (or group of blocks) to the server 605B. Each file extent can be requested until the file is able to be reconstructed.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
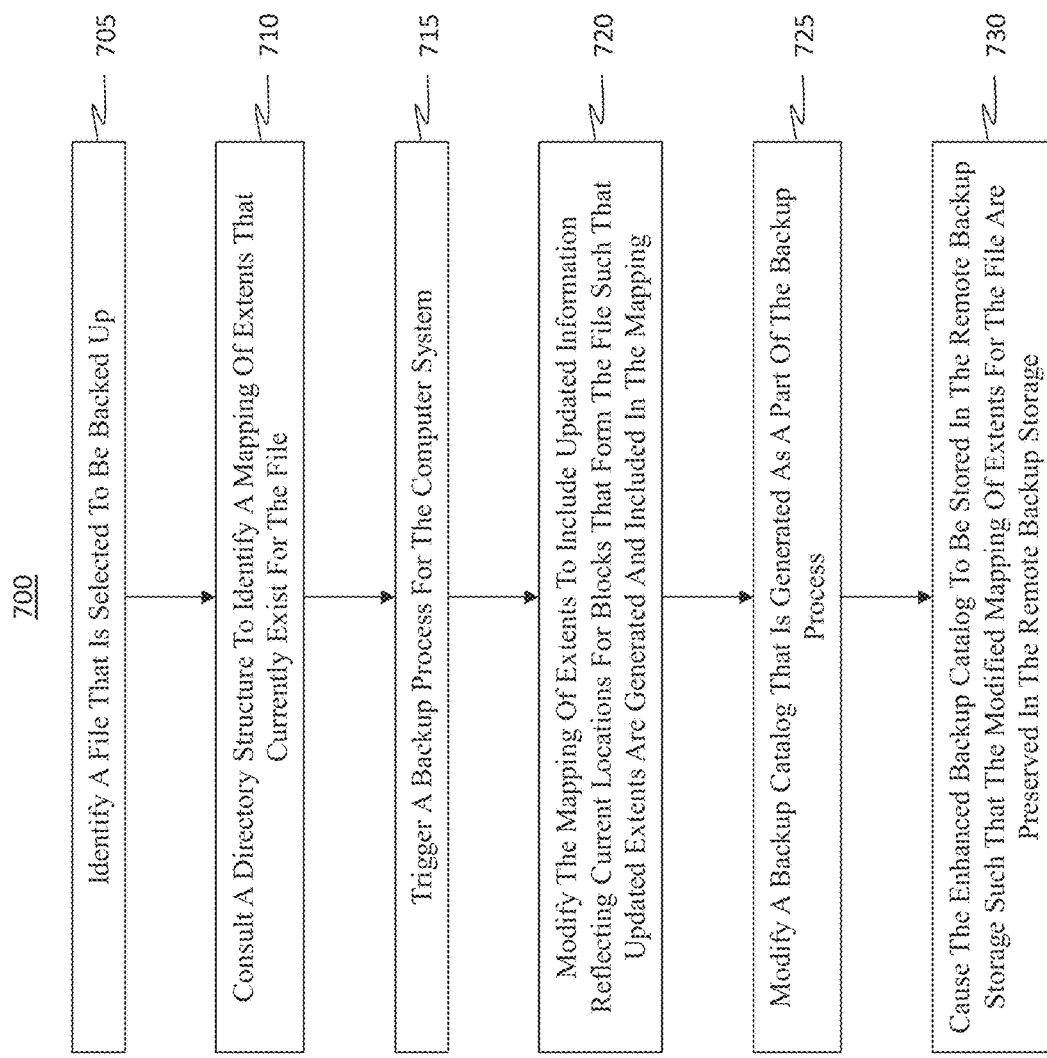
FIG. 7 illustrates a flowchart of an example method for generating an enhanced backup catalog that preserves file extents for a file that is backed up during a backup process.

Attention will now be directed to FIG. 7, which illustrates a flowchart of an example method 700 for generating an enhanced backup catalog that preserves file extents for a file that is backed up during a backup process. Method 700 can be performed within the architecture 300 of FIG. 3 and using the backup engine 320.

Initially, method 700 includes an act (act 705) of identifying a file that is selected to be backed up. For example, the file 105 from FIG. 1 can be representative of this file. The file 105 can be included as a part of a larger backup process, such as perhaps where an entire partition or disk is being backed up.

Act 710 then includes consulting a directory structure (e.g., directory structure 315 from FIG. 3) to identify a mapping (e.g., mapping 145 from FIG. 1) of extents that currently exist for the file. Notably, the extents are distributed across different portions of storage of a computer system that is storing the file. To illustrate, FIG. 1 showed how the different extents are dispersed or distributed across different portions of the disk 150. Each one of the extents includes one or more blocks of data for the file.

In some cases, the extents of the file are virtual extents that are created for the file, such as in a scenario where the underlying file system does not use extents or in a scenario where the file was not stored using an extent framework. In some cases, the extents are already provided in the file directory.

Act 715 involves triggering a backup process for the computer system. Here, chunks of data stored by the computer system are selected for backup to remote backup storage. Additionally, the chunks of data are selected in a manner such that, for at least one of the extents, blocks forming that extent are included in different chunks resulting in those blocks being dispersed during the backup process. For instance, the extent 125 from FIG. 1 is also shown in FIG. 3. One of the blocks in that extent is included in backup chunk 210A while the other blocks are included in backup chunk 215A. As a consequence, the blocks that formed the extent are included in different chunks during the backup process.

Act 720 includes modifying the mapping of extents to include updated information reflecting current locations for blocks that form the file. As a consequence, updated extents are generated and included in the mapping. Because the blocks in a particular extent might no longer be contiguous with one another, the mapping can be modified to indicate where those blocks are now located. In some cases, each extent in the modified mapping of extents can include a starting offset and a length. In some cases, each extent can include a starting offset and an end position.

Act 725 includes modifying a backup catalog that is generated as a part of the backup process. The backup catalog is modified to include the modified mapping of extents for the file such that the modified mapping of extents for the file is preserved in the backup catalog. The process of including the modified mapping of extents for the file in the backup catalog results in the generation of an enhanced backup catalog. In some cases, the process of modifying the backup catalog to include the modified mapping of extents can include (i) compressing the modified mapping of extents, (ii) encoding the modified mapping of extents, and then (iii) including the compressed, encoded, and modified mapping of extents in the backup catalog. As discussed previously, different extent types can be included in the modified backup catalog.

Act 730 then involves causing the enhanced backup catalog to be stored in the remote backup storage. As a consequence, the modified mapping of extents for the file are preserved in the remote backup storage. In some cases, the enhanced backup catalog is a full text catalog that is fully searchable using text parameters.

In some cases, the method can further include refraining (e.g., during a data retrieval process in which the blocks that form the file are retrieved) from mounting a backup of the file. As a consequence, the modified mapping of extents, which is included in the enhanced backup catalog, enables direct file extraction from the remote backup storage.

Figure 8:
FIG. 8 illustrates a flowchart of an example method for using an enhanced backup catalog, which preserves file extents for a file that is backed up and which is included in a remote backup storage, to extract the file directly from the remote backup storage without mounting the backup.

FIG. 8 shows another flowchart of an example method 800. Method 800 describes operations for using an enhanced backup catalog, which preserves file extents for a file that is backed up and which is included in a backup in a remote backup storage, to extract the file directly from the remote backup storage without mounting the backup. Method 800 can be performed subsequent in time to the method 700. For instance, method 700 involves operations for generating and storing the enhanced backup catalog in the backup storage while method 800 involves operations for accessing and using the enhanced backup catalog to extract the backed up data. Additionally, method 800 can be performed within the architecture 500 of FIG. 5 and can be performed by the retrieval engine 525.

Initially, method 800 includes an act (act 805) of receiving a request to access a backup of a file that is backed up to a remote backup storage. The data 505A from FIG. 5 can be representative of the file that is backed up.

Act 810 involves refraining from mounting the backup of the file. That is, the embodiments avoid mounting the backup to the computer system requesting access to the backup.

Act 815 includes accessing an enhanced backup catalog at the remote backup storage. The enhanced backup catalog includes a mapping of extents for the file. Additionally, the mapping of extents identifies locations where blocks of data forming the file are stored in the remote backup storage. In some cases, the mapping of extents for the file includes a virtual disk extent while in other cases actual extents are included.

Act 820 includes consulting the enhanced backup catalog to identify the mapping of extents. The process of identifying the mapping of extents can include (i) decoding the mapping of extents and (ii) in response to determining the decoded mapping of extents is in a compressed form, extracting the decoded mapping of extents.

The mapping of extents is then used (act 825) to identify the blocks of data forming the file. Finally, act 830 involves retrieving the file based on the identified blocks of data.

In some cases, the blocks of data are included in a data stream such that the file is retrieved via the data stream. In other cases, the file is retrieved by reading each one of the blocks of data directly from the backup storage. In some cases, the process of retrieving the file includes accessing multiple different backups. For instance, it may be the case that a backup stores only a delta that has occurred since a last backup. The embodiments can access the previous backup (or multiple backups) and then access the current backup in order to reconstruct the file, thereby resulting in a scenario where multiple different backups are used.

Figure 9:
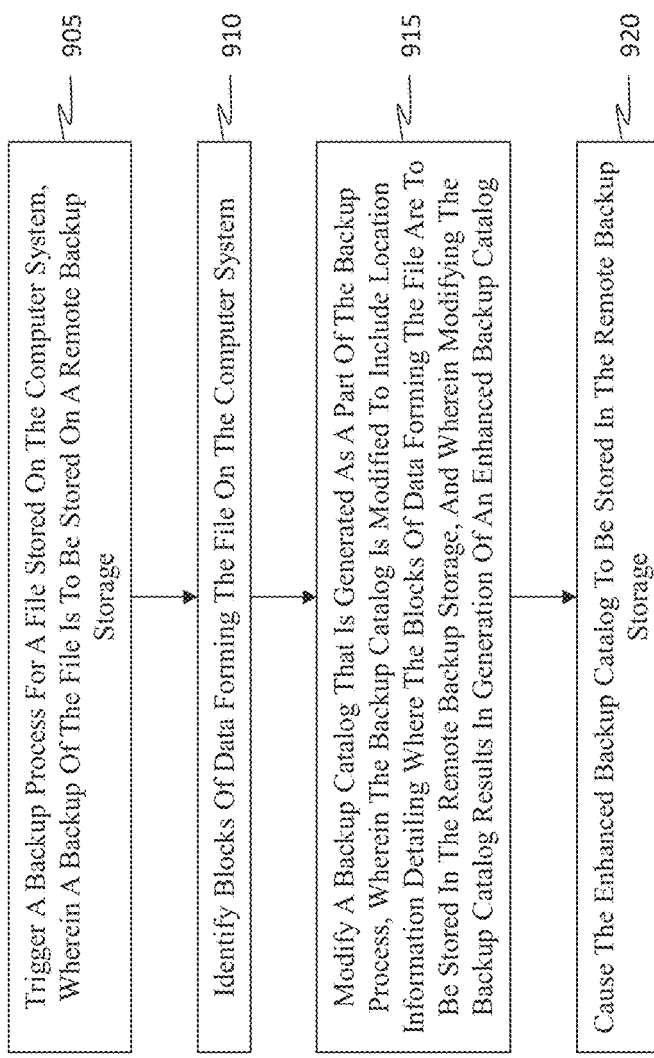
FIG. 9 illustrates another flowchart of an example method for generating an enhanced backup catalog.

FIG. 9 shows yet another flowchart of an example method 900, which describes embodiments that are configured to generate an enhanced backup catalog that preserves file extents for a file that is backed up during a backup process. Initially, method 900 includes an act (act 905) of triggering a backup process for a file stored on the computer system. Here, a backup of the file is to be stored on a remote backup storage.

Act 910 involves identifying blocks of data forming the file on the computer system. For instance, the blocks 110, 115, and 120, among others, can be identified in the disk 150 of FIG. 1.

Act 915 includes modifying a backup catalog that is generated as a part of the backup process. The backup catalog is modified to include location information detailing where the blocks of data forming the file are to be stored in the remote backup storage. Also, the process of modifying the backup catalog results in generation of an enhanced backup catalog.

Act 920 then includes causing the enhanced backup catalog to be stored in the remote backup storage. This enhanced backup catalog can later be used by an accessing device to directly access the backup without having to mount the backup.

Accordingly, by normalizing "content access" across all the disparate backup formats, the retrieval process can be performed directly and quickly from the backup object(s). Additionally, access across many backups during the same retrieval request is simplified. Furthermore, by following the disclosed principles, no longer does the retrieval process need to target a single backup; instead, it can span multiple backups. Also, retrieval from foreign file system backups is no longer an issue. The requirements to mount backups either on the retrieval server or in the destination asset is also removed.

Another benefit relates to the speed of retrieval, which is improved since the loading of operating systems, backups, and file systems has been removed. Furthermore, many versions of the same file across different backups can be retrieved in a single request. The file retrieval is also now file system agnostic. Additionally, the process of retrieving file content can be performed directly from the backup regardless of file system or backup format.

Example Computer/Computer Systems

Figure 10:
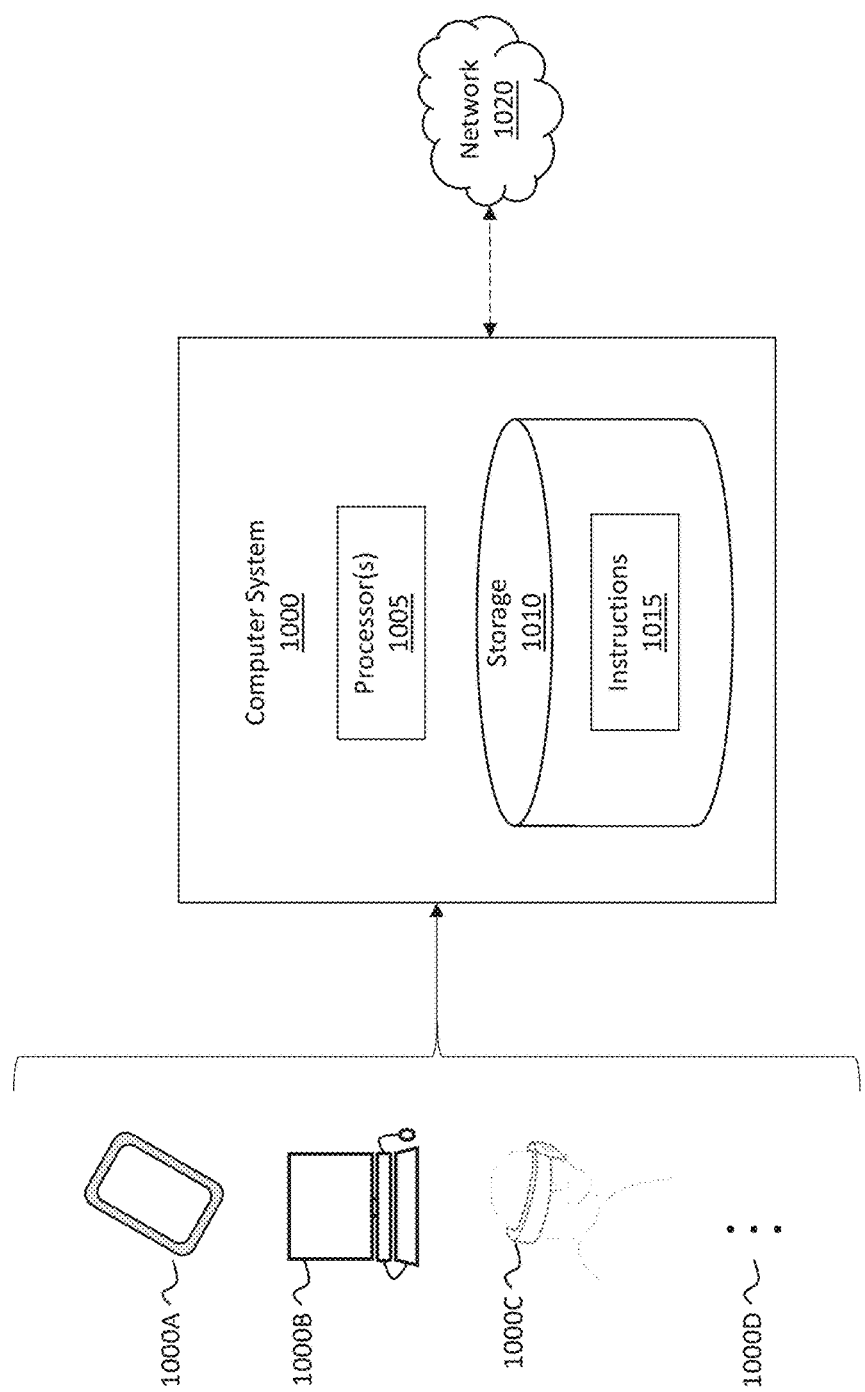
FIG. 10 illustrates an example computer system configured to perform any of the disclosed operations.

Attention will now be directed to FIG. 10 which illustrates an example computer system 1000 that may include and/or be used to perform any of the operations described herein. Computer system 1000 may take various different forms. For example, computer system 1000 may be embodied as a tablet 1000A, a desktop or a laptop 1000B, a wearable device 1000C, a mobile device, or a standalone device. The ellipsis 1000D indicates that the computer system 1000 can take on any other form as well. Computer system 1000 may also be a distributed system that includes one or more connected computing components/devices that are in communication with computer system 1000.

In its most basic configuration, computer system 1000 includes various different components. FIG. 10 shows that computer system 1000 includes one or more processor(s) 1005 (aka a "hardware processing unit") and storage 1010.

Regarding the processor(s) 1005, it will be appreciated that the functionality described herein can be performed, at least in part, by one or more hardware logic components (e.g., the processor(s) 1005). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1000. The different components, modules, engines, and services described herein may be implemented as objects or processors that execute on computer system 1000 (e.g. as separate threads).

Storage 1010 may be physical system memory, which may be volatile, non-volatile, or some combination of the two. The term "memory" may also be used herein to refer to non-volatile mass storage such as physical storage media. If computer system 1000 is distributed, the processing, memory, and/or storage capability may be distributed as well.

Storage 1010 is shown as including executable instructions 1015. The executable instructions 1015 represent instructions that are executable by the processor(s) 1005 of computer system 1000 to perform the disclosed operations, such as those described in the various methods.

The disclosed embodiments may comprise or utilize a special-purpose or general-purpose computer including computer hardware, such as, for example, one or more processors (such as processor(s) 1005) and system memory (such as storage 1010), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1000 may also be connected (via a wired or wireless connection) to external sensors (e.g., one or more remote cameras) or devices via a network 1020. For example, computer system 1000 can communicate with any number devices or cloud services to obtain or process data. In some cases, network 1020 may itself be a cloud network. Furthermore, computer system 1000 may also be connected through one or more wired or wireless networks to remote/separate computer systems(s) that are configured to perform any of the processing described with regard to computer system 1000.

A "network," like network 1020, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1000 will include one or more communication channels that are used to communicate with the network 1020. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

In view of the foregoing, the present invention may be embodied in multiple different configurations, as outlined above, and as exemplified by the following aspects.

1. A method for generating an enhanced backup catalog that preserves file extents for a file that is backed up during a backup process, said method comprising:
    identifying a file that is selected to be backed up;
    consulting a directory structure to identify a mapping of extents that currently exist for the file, wherein the extents are distributed across different portions of storage of a computer system that is storing the file, and wherein each one of the extents includes one or more blocks of data for the file;
    triggering a backup process for the computer system, wherein:
        chunks of data stored by the computer system are selected for back up to remote backup storage, and
        the chunks of data are selected in a manner such that, for at least one of the extents, blocks forming the at least one extent are included in different chunks resulting in those blocks being dispersed during the backup process;
    modifying the mapping of extents to include updated information reflecting current locations for blocks that form the file such that updated extents are generated and included in the mapping;
    modifying a backup catalog that is generated as a part of the backup process, wherein the backup catalog is modified to include the modified mapping of extents for the file such that the modified mapping of extents for the file is preserved in the backup catalog, and wherein including the modified mapping of extents for the file in the backup catalog results in generation of an enhanced backup catalog; and
    causing the enhanced backup catalog to be stored in the remote backup storage such that the modified mapping of extents for the file is preserved in the remote backup storage.

2. The method according to preceding Aspect 1, wherein the method further includes, during a data retrieval process in which the blocks that form the file are retrieved, refraining from mounting a backup of the file.

3. The method according to preceding Aspects 1 to 2, wherein modifying the backup catalog to include the modified mapping of extents includes:
    compressing the modified mapping of extents;
    encoding the modified mapping of extents; and including the compressed, encoded, and modified mapping of extents in the backup catalog.

4. The method according to preceding Aspects 1 to 3, wherein the extents of the file are virtual extents created for the file.

5. The method according to preceding Aspects 1 to 4, wherein each extent in the modified mapping of extents includes a starting offset and a length.

6. The method according to preceding Aspects 1 to 5, wherein different extent types are included in the modified backup catalog.

7. The method according to preceding Aspects 1 to 7, wherein the modified mapping of extents, which is included in the enhanced backup catalog, enables direct file extraction from the remote backup storage.

8. The method according to preceding Aspects 1 to 7, wherein the enhanced backup catalog is a full text catalog.

9. A method for using an enhanced backup catalog, which preserves file extents for a file that is backed up and which is included in a backup in a remote backup storage, to extract the file directly from the remote backup storage without mounting the backup, said method comprising:
   receiving a request to access a backup of a file that is backed up to a remote backup storage;
   refraining from mounting the backup of the file;
   accessing an enhanced backup catalog at the remote backup storage, wherein the enhanced backup catalog includes a mapping of extents for the file, and wherein the mapping of extents identifies locations where blocks of data forming the file are stored in the remote backup storage;
   consulting the enhanced backup catalog to identify the mapping of extents;
   using the mapping of extents to identify the blocks of data forming the file; and
   retrieving the file based on the identified blocks of data.

10. The method according to preceding Aspect 9, wherein the blocks of data are included in a data stream such that the file is retrieved via the data stream.

11. The method according to preceding Aspects 9 to 10, wherein the file is retrieved by reading each one of said blocks of data.

12. The method according to preceding Aspects 9 to 11, wherein retrieving the file includes accessing multiple different backups.

13. The method according to preceding Aspects 9 to 12, wherein retrieving the file is performed agnostically relative to a file system type.

14. The method according to preceding Aspects 9 to 13, wherein retrieving the file is performed agnostically relative to a backup format.

15. The method according to preceding Aspects 9 to 14, wherein the mapping of extents for the file includes a virtual disk extent.

16. The method according to preceding Aspects 9 to 15, wherein identifying the mapping of extents includes:
   decoding the mapping of extents; and
   in response to determining the decoded mapping of extents is in a compressed form, extracting the decoded mapping of extents.

17. A computer system configured to generate an enhanced backup catalog that preserves file extents for a file that is backed up during a backup process, said computer system comprising:
   one or more processors; and
   one or more computer-readable hardware storage devices that store instructions that are executable by the one or more processors to cause the computer system to:
   trigger a backup process for a file stored on the computer system, wherein a backup of the file is to be stored on a remote backup storage;
   identify blocks of data forming the file on the computer system;
   modify a backup catalog that is generated as a part of the backup process, wherein the backup catalog is modified to include location information detailing where the blocks of data forming the file are to be stored in the remote backup storage, and wherein modifying the backup catalog results in generation of an enhanced backup catalog; and cause the enhanced backup catalog to be stored in the remote backup storage.

18. The computer system according to preceding Aspect 17, wherein the location information detailing where the blocks of data forming the file are to be stored is included in extents describing the file.

19. The computer system according to preceding Aspects 17 to 18, wherein the extents are encoded prior to being included in the enhanced backup catalog.

20. The computer system according to preceding Aspects 17 to 19, wherein the extents are compressed prior to being included in the enhanced backup catalog.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating an enhanced backup catalog that preserves file extents for a file that is backed up during a backup process, said method comprising:
   identifying a file that is selected to be backed up;
   consulting a directory structure to identify a mapping of extents that currently exist for the file, wherein the extents are distributed across different portions of storage of a computer system that is storing the file, and wherein each one of the extents includes one or more blocks of data for the file;
   triggering a backup process for the computer system, wherein:
      chunks of data stored by the computer system are selected for back up to remote backup storage, and
      the chunks of data are selected in a manner such that, for at least one of the extents, blocks forming the at least one extent are included in different chunks resulting in those blocks being dispersed during the backup process;
   modifying the mapping of extents to include updated information reflecting current locations for blocks that form the file such that updated extents are generated and included in the mapping;
   modifying a backup catalog that is generated as a part of the backup process, wherein the backup catalog is modified to include the modified mapping of extents for the file such that the modified mapping of extents for the file is preserved in the backup catalog, and wherein including the modified mapping of extents for the file in the backup catalog results in generation of an enhanced backup catalog; and causing the enhanced backup catalog to be stored in the remote backup storage such that the modified mapping of extents for the file is preserved in the remote backup storage.

2. The method of claim 1, wherein the method further includes, during a data retrieval process in which the blocks that form the file are retrieved, refraining from mounting a backup of the file.

3. The method of claim 1, wherein modifying the backup catalog to include the modified mapping of extents includes:
compressing the modified mapping of extents;
encoding the modified mapping of extents; and
including the compressed, encoded, and modified mapping of extents in the backup catalog.

4. The method of claim 1, wherein the extents of the file are virtual extents created for the file.

5. The method of claim 1, wherein each extent in the modified mapping of extents includes a starting offset and a length.

6. The method of claim 1, wherein different extent types are included in the modified backup catalog.

7. The method of claim 1, wherein the modified mapping of extents, which is included in the enhanced backup, enables direct file extraction from the remote backup storage.

8. The method of claim 1, wherein the modified backup catalog is a full text catalog.

9. A method for using an enhanced backup catalog, which preserves file extents for a file that is backed up and which is included in a backup in a remote backup storage, to extract the file directly from the remote backup storage without mounting the backup, said method comprising:
receiving a request to access a backup of a file that is backed up to a remote backup storage;
refraining from mounting the backup of the file;
accessing an enhanced backup catalog at the remote backup storage, wherein the enhanced backup catalog includes a mapping of extents for the file, and wherein the mapping of extents identifies locations where blocks of data forming the file are stored in the remote backup storage;
consulting the enhanced backup catalog to identify the mapping of extents;
using the mapping of extents to identify the blocks of data forming the file; and
retrieving the file based on the identified blocks of data.

10. The method of claim 9, wherein the blocks of data are included in a data stream such that the file is retrieved via the data stream.

11. The method of claim 9, wherein the file is retrieved by reading each one of said blocks of data.

12. The method of claim 9, wherein retrieving the file includes accessing multiple different backups.

13. The method of claim 9, wherein retrieving the file is performed agnostically relative to a file system type.

14. The method of claim 9, wherein retrieving the file is performed agnostically relative to a backup format.

15. The method of claim 9, wherein the mapping of extents for the file includes a virtual disk extent.

16. The method of claim 9, wherein identifying the mapping of extents includes:
decoding the mapping of extents; and
in response to determining the decoded mapping of extents is in a compressed form, extracting the decoded mapping of extents.

17. A computer system configured to generate an enhanced backup catalog that preserves file extents for a file that is backed up during a backup process, said computer system comprising:
one or more processors; and
one or more computer-readable hardware storage devices that store instructions that are executable by the one or more processors to cause the computer system to:
trigger a backup process for a file stored on the computer system, wherein a backup of the file is to be stored on a remote backup storage;
identify blocks of data forming the file on the computer system;
modify a backup catalog that is generated as a part of the backup process, wherein the backup catalog is modified to include location information detailing where the blocks of data forming the file are to be stored in the remote backup storage, and wherein modifying the backup catalog results in generation of an enhanced backup catalog; and
cause the enhanced backup catalog to be stored in the remote backup storage.

18. The computer system of claim 17, wherein the location information detailing where the blocks of data forming the file are to be stored is included in extents describing the file.

19. The computer system of claim 18, wherein the extents are encoded prior to being included in the enhanced backup catalog.

20. The computer system of claim 18, wherein the extents are compressed prior to being included in the enhanced backup catalog.

* * * * *